(12) United States Patent
U et al.

(10) Patent No.: US 12,436,985 B2
(45) Date of Patent: *Oct. 7, 2025

(54) FEATURING ENGINEERING BASED ON SEMANTIC TYPES

(71) Applicant: American Express Travel Services Company, Inc., New York, NY (US)

(72) Inventors: Man Chon U, Sunrise, FL (US); Beau Britain, Sunrise, FL (US); Thai Chiun Huang, Palto Alto, CA (US); Yan Yang, Sunrise, FL (US); Linou Zhu, Palo Alto, CA (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/733,650

(22) Filed: Jun. 4, 2024

(65) Prior Publication Data
US 2024/0320252 A1 Sep. 26, 2024

Related U.S. Application Data

(63) Continuation of application No. 17/539,557, filed on Dec. 1, 2021, now Pat. No. 12,001,467.

(51) Int. Cl.
*G06F 7/00* (2006.01)
*G06F 16/35* (2019.01)
*G06N 5/04* (2023.01)

(52) U.S. Cl.
CPC .............. *G06F 16/35* (2019.01); *G06N 5/04* (2013.01)

(58) Field of Classification Search
CPC .. G06F 16/35; G06F 16/907; G06F 16/24568; G06F 16/951; G06F 16/382; G06N 5/04; G06N 20/00
See application file for complete search history.

(56) References Cited

U.S. PATENT DOCUMENTS

| | | | |
|---|---|---|---|
| 8,606,965 B1 * | 12/2013 | Parasnis | G06Q 30/0601 709/246 |
| 10,445,056 B1 * | 10/2019 | Morris | G10L 25/57 |
| 12,001,467 B1 * | 6/2024 | U | G06F 16/35 |
| 2019/0325352 A1 * | 10/2019 | Tsai | G06F 16/282 |
| 2021/0049239 A1 * | 2/2021 | Li | G06F 40/30 |
| 2021/0216910 A1 * | 7/2021 | Tomoda | G06N 20/00 |

* cited by examiner

*Primary Examiner* — Mohammad A Sana
(74) *Attorney, Agent, or Firm* — STERNE, KESSLER, GOLDSTEIN & FOX P.L.L.C.

(57) ABSTRACT

A computer-based system may engineer features based on semantic types. The computer-based system may implement deep learning algorithms and derive a domain-specific feature engineering strategy from semantic type predictions and data profiling. The computer-based system may utilize embedded domain (e.g., financial industry, etc.) knowledge to generate curated features from raw data (e.g., transactional datasets, relational datasets, etc.).

20 Claims, 9 Drawing Sheets

FEATURING ENGINEERING BASED ON SEMANTIC TYPES

CROSS-REFERENCE TO RELATED APPLICATIONS

This application claims the benefit of U.S. patent application Ser. No. 17/539,557, file on Dec. 1, 2021, the contents of which are hereby incorporated by reference in their entirety.

BACKGROUND

Traditional data preparation and analysis systems, such as existing open source and commercial systems, take matching-based approaches to semantic type detection. While matching-based approaches such as regular expression matching, dictionary look-ups, and/or the like are sufficient for detecting simple types, these matching-based approaches lack domain knowledge and thus are unable to discover domain-specific semantic types that may be used for feature engineering. Feature engineering is routinely a manual process that requires domain knowledge and coding to build features one at a time. Feature engineering is a tedious, error-prone, and time-consuming task. Conventional feature engineering tools operate on unstructured data and are not capable of engineering features from transactional datasets, for example, in a big data environment, relating to a specific domain such as the financial industry. Conventional feature engineering tools lack transparency and do not enable decision logic for a given feature engineering strategy to be reviewed, revised, and/or optimized. Thus, engineering domain-specific features, such as features that may be used by a domain-specific pipeline to implement a practical machine learning workflow is challenging.

SUMMARY

Methods and systems for feature engineering based on semantic types are described. According to some aspects, features that may be used by one or more machine learning pipelines (e.g., domain-specific machine learning pipelines, etc.) may be automatically generated from raw data (e.g., transactional data, non-transactional data, relational dataset, temporal datasets, etc.). A computer-based system and/or computing device may receive a plurality of data structures of raw data, for example, a plurality of columns of raw data and/or the like. A semantic type may be determined for each data structure of the plurality of data structures. For example, a semantic type may be determined for a data structure based on a semantic rule that describes how to infer a semantic type from a data element of the plurality of data elements of the data structure. According to some aspects, a semantic type determined for a data structure may be used to select a feature engineering instruction for the data structure. For example, the feature engineering instruction may describe how to calculate an input feature for a machine learning model based on the plurality of data elements of the data structure. The feature engineering instruction may be used to determine, generate, and/or engineer features (e.g., measurable attributes depicted by a column in a raw dataset, etc.) that may be input to a machine learning pipeline and/or used to facilitate a prediction associated with the raw data.

Certain aspects of the disclosure have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION

Provided herein are methods and systems for feature engineering based on semantic types. According to some aspects, features that may be used by one or more machine learning pipelines (e.g., domain-specific machine learning pipelines, etc.) may be automatically generated from raw data (e.g., transactional data, non-transactional data, relational dataset, temporal datasets, etc.). A computer-based system may receive a plurality of data structures (e.g., columns, etc.) of raw data (e.g., transactional data, non-transactional data, etc.), for example, from a data lake and/or the like. Deep learning may be used to determine a semantic type for each data structure of the plurality of data structures. For example, a semantic type may be determined for a data structure based on a semantic rule that describes how to infer a semantic type from a data element of the data structure, such as textual data and/or metadata within and/or indicative of a row of a column and/or the like. According to some aspects, the computer-based system may include a corpus of predefined semantic types (e.g., generic semantic types, domain-specific semantic types, etc.), for example, a corpus of predefined financial data semantics and/or the like, that may be used to predict and/or infer a semantic type of a data element.

According to some aspects, the raw data may be profiled to provide preprocessing relative to determined semantic types. For example, data profiling may be used to examine the raw data and determine/collect statistics and/or informative summaries about the raw data, such as an indication of a domain relating to the raw data (e.g., an indication of finance data, etc.). Determining the data profile may be based on column profiling, cross-column profiling, cross-table profiling, or data rule validation. For example, the computer-based system may determine a data profile for the raw data based on an amount of data elements of each of the plurality of data structures satisfying a statistical threshold for indicating data profiles. The statistical threshold may be based on a distribution of characters indicated by each data element of the plurality of data elements for each column of the plurality of columns. The computer-based system may determine that the semantic types for a portion of data structures of the plurality of data structures correspond to the data profile. Based on determining that the semantic types correspond to the data profile, the computer-based system may validate the semantic type for each data structure of the portion of data structures of the raw data.

The computer-based system may determine transformation and/or aggregation logic for the raw data based on the determined semantic types and/or profiling. For example, according to some aspects, a semantic type determined for a data structure may be used to select a feature engineering instruction for the data structure. For example, the feature engineering instruction may describe how to calculate an input feature for a machine learning model based on the plurality of data elements of the data structure. The feature engineering instruction may be used to determine, generate, and/or engineer features. For example, features may include measurable attributes depicted by a column in a raw dataset, and/or data/information describing the semantic content, distribution of characters, interrelationships, global statistics, and/or the like of raw data. Engineered features may be input to a machine learning pipeline and/or used to facilitate a prediction associated with the raw data. For example, engineered features may better represent the nature and/or underlying concepts of raw data to the machine learning pipeline, resulting in improved accuracy of the machine learning pipeline on unseen data.

The methods and systems for feature engineering based on semantic types provide improvements over conventional systems. For example, the methods and systems described may be implemented for domain-specific feature engineering without coding or pre-existent domain knowledge required by conventional systems. The methods and systems described enable features to be ranked and optimized based on a target machine learning pipeline. These and other advantages are described herein.

Figure 1:
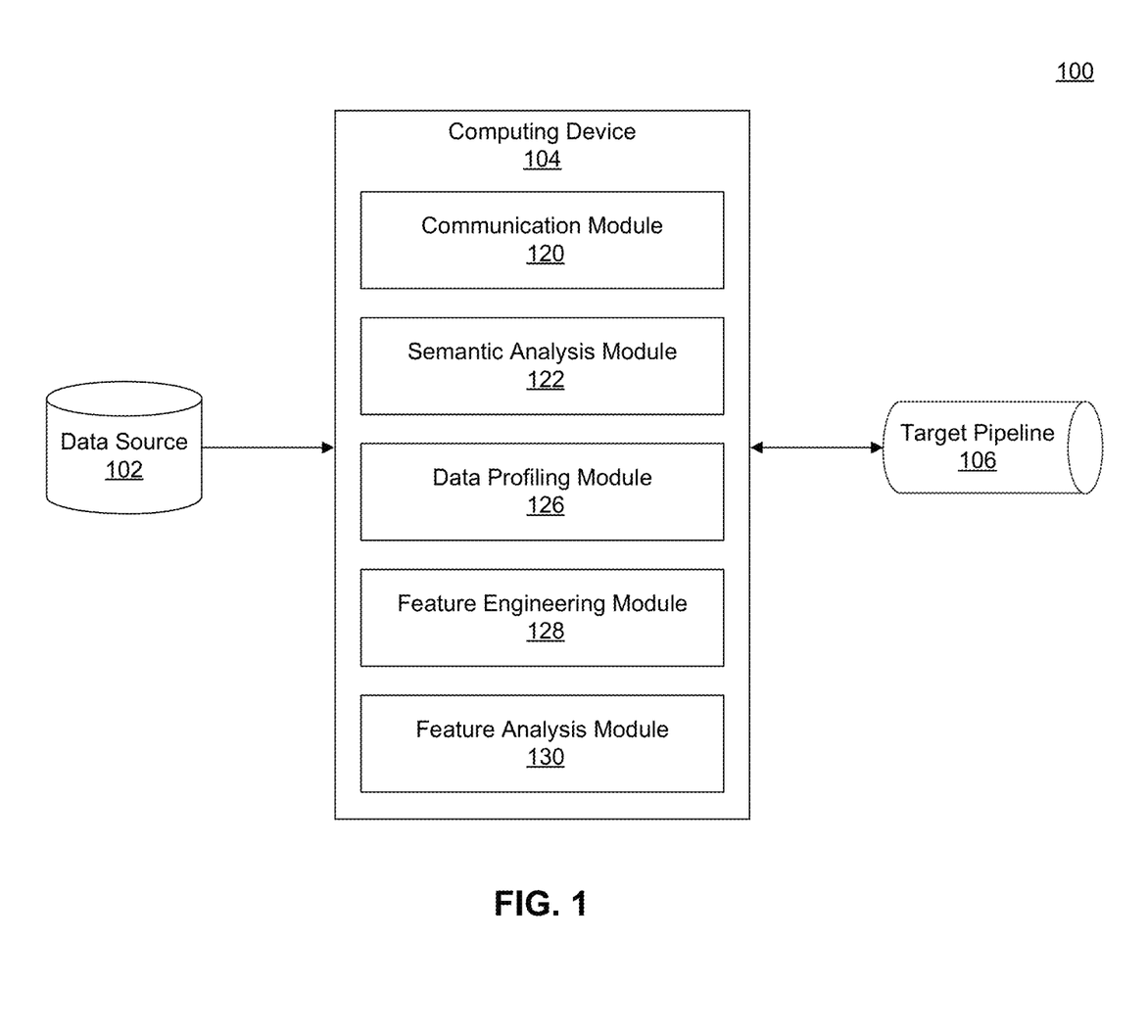
FIG. 1 shows a block diagram of an example system for feature engineering based on semantic types, according to some aspects.

FIG. 1 shows a block diagram of an example system 100 for feature engineering based on semantic types. System 100 may include a data source 102, a computing device 104, and a target pipeline 106.

The data source 102 may be, for example, a data lake and/or corpus of finance data (or any other type of data). Although only a single data source 102 is shown, the system 100 may include any number of data sources. The target pipeline 106 may include a machine learning model/pipeline, such as an Extract, Transform, and Load (ETL) pipeline (e.g., Apache Spark® pipeline, etc.), and/or any pipeline useful for implementing practical machine learning workflow. According to some aspects, the target pipeline 106 may be generic and/or used to process generic and/or domain-agnostic data. According to some aspects, the target pipeline 106 may be domain-specific and/or used to process domain-specific data, for example, such as financial industry data and/or the like.

The computing device 104 may be configured, for example, to determine, generate, and/or engineer domain-specific (and/or generic) features based on semantic types determined from raw data. The computing device 104 may include a communication module 120 for providing an interface to a user (e.g., a machine learning engineer, a data analyst/scientist, etc.) to interact with the computing device 104. The communication module 120 may be any interface for presenting and/or receiving information to/from the user. An interface may be a communication interface such as a command window, a web browser, a display, and/or any other type of interface. Other software, hardware, and/or interfaces may be used to provide communication between the user the computing device 104. The communication module 120 may request or query various files from a local source (e.g., a semantic rules repository, a domain data repository, a feature engineering instruction repository, etc.) and/or a remote source, for example, the data source 102. The communication module 120 may transmit data, such as engineered features and/or the like, to a local or remote data target, such as the target pipeline 106 and/or the like.

The computing device 104 may include a semantics analysis module 122. The semantics analysis module 122 may be a deep learning module and/or the like configured to determine semantic types from raw data. The semantics analysis module 122 may include/store predefined sets of semantic types (e.g., generic semantic types, domain-specific semantic types, etc.), for example, such as embedded domain knowledge related to finance and/or the financial industry. For example, the semantics analysis module 122 may include/store predefined semantic types derived from financial datasets, such a "spend amount," "spend category," "age," and/or the like.

The semantics analysis module 122 may receive raw data, for example, from the data source 102, and determine/predict semantic types based on metadata and/or sampling the data with one or more deep learning algorithms. For example, the semantics analysis module 122 may include and/or communicate with one or more integrated applications (e.g., data analysis simulators, component-based APIs, Apache Spark®, Theano®, PyTorch®, OpenCV®®, Keras®, MATLAB®, TensorFlow®, etc.) and/or neural networks trained/configured to with the predefined semantic types to determine/predict semantic types from raw data. According to some aspects, the semantics analysis module 122 may include a primary neural network configured with one or more subnetworks. Each subnetwork may be trained to predict a different semantic type. According to some aspects, the semantics analysis module 122 may be trained to determine/predict semantic types by metadata (e.g., based on metadata token matching rules, etc.) from a corpus of domain-specific data.

Figure 2:
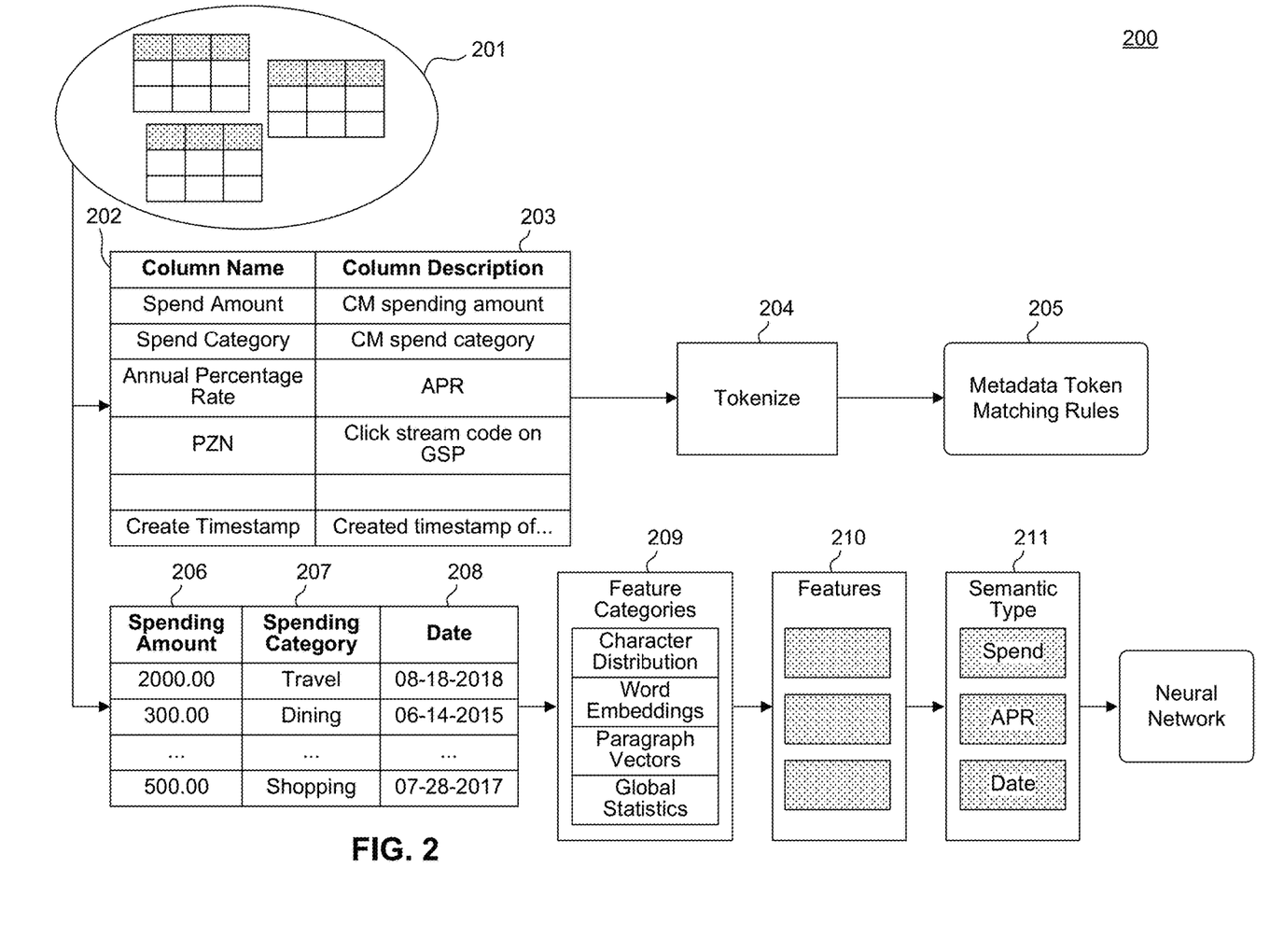
FIG. 2 shows an example of data processing and analysis flow for determining semantic types from raw data, according to some aspects.

FIG. 2 shows an example data processing and analysis flow 200 for training/preparing (e.g., embedding domain-specific knowledge, etc.) the semantics analysis module 122 to determine semantic types from raw data, according to some aspects. The semantics analysis module 122 may be trained based on a source corpus of any domain-specific data. For example, a source corpus 201 may be a source corpus in finance and/or related to the financial industry.

According to some aspects, to train the semantics analysis module 122 to determine semantic types metadata based on metadata token matching rules, the semantics analysis module 122 may receive the data structures from the source corpus 201 such as columns 202 and 203. At 204, the semantics analysis module 122 may tokenize metadata from the columns 202 and 203. For example, data elements within rows of the columns 202 and 203 may be split into tokens (e.g., individual words, punctuation, numbers, etc.) and the tokens may be transformed, filtered, and/or annotated. The semantics analysis module 122 may tokenize metadata from the columns 202 and 203 to prepare the raw texts in a way that makes it easier to perform eventual analysis methods in a later stage, such as determining metadata token matching rules 205 and/or reducing noise in the dataset.

Figure 3A:
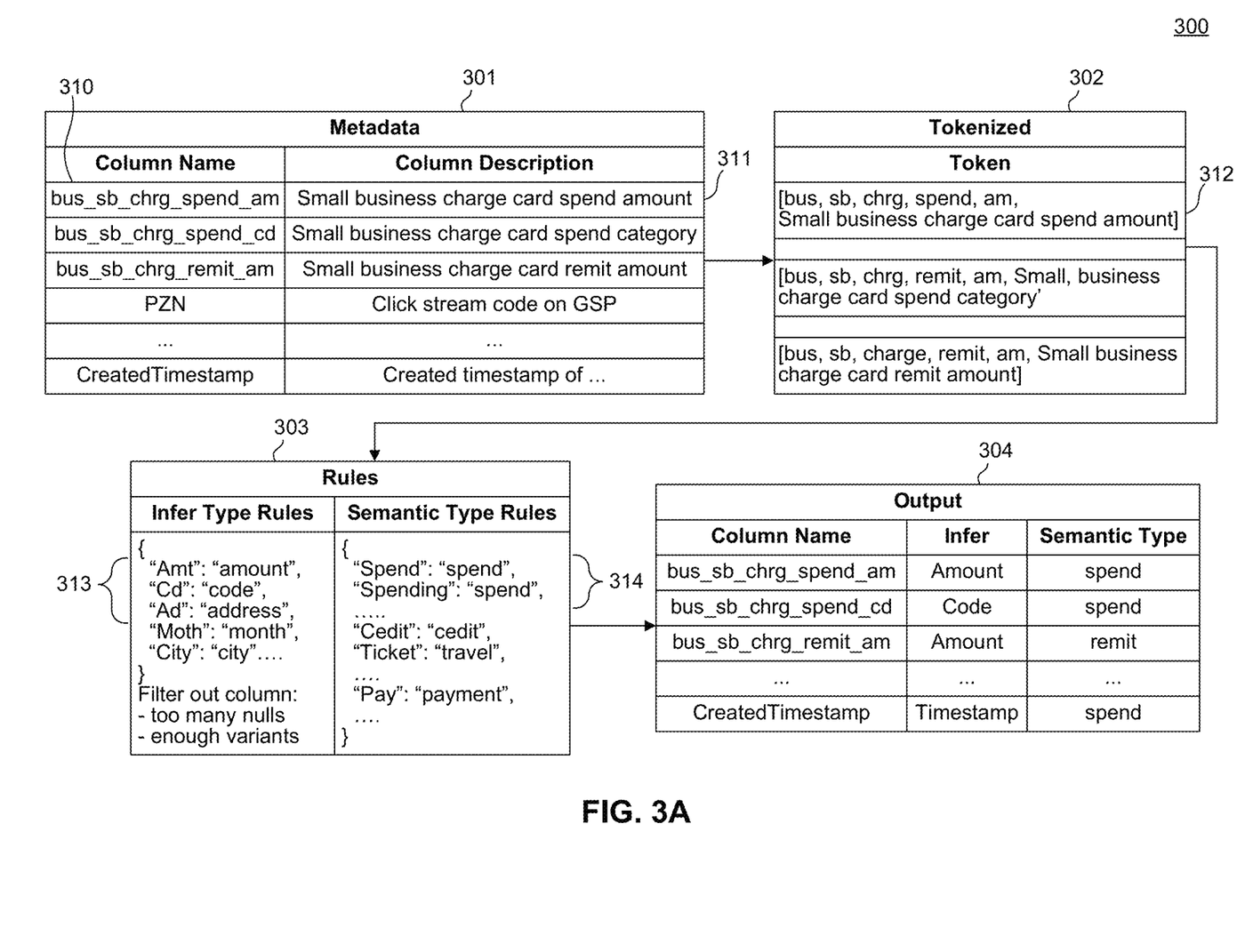
FIG. 3A shows an example flow diagram for determining semantic types from raw data.

FIG. 3 shows an example data flow 300 implemented by the semantics analysis module 122 to determine semantic types based on metadata token matching rules 205. According to some aspects, metadata 301 indicative of data elements within data structures, such as the columns 202 and 203 of FIG. 2, may be determined from the source corpus 201. As shown at 302, the metadata may be tokenized. For example, the metadata 310 indicating a column name "bus_sb_chrg_spend_am" and metadata 311 "small business charge card spend amount" describing the contents of the column may be tokenized at 302 and represented as the token 312 "[bus, sb, charge, spend, am, Small, business charge card spend amount]."

At 303, the semantics analysis module 122 may apply one or more rules to tokenized metadata, such as the token 312 and/or the like, to determine its nature. For example, the semantics analysis module 122 may use inference rules to infer a semantic type from partial data. The inference rules may domain-specific. For example, when processing financial data, as shown at 313, "Amt" may be inferred to represent "amount," "Cd" may be inferred to represent "code," and/or "Ad" may be inferred to represent "address." The inference rules may include rules for filtering data from data structures, such as filtering out based on an amount of determined null values, variant data, and/or the like. According to some aspects, the semantics analysis module 122 may store and/or use any type of inference rule.

According to some aspects, the semantics analysis module 122 may store and use semantic type rules to infer semantic types from tokenized semantic metadata (e.g., metadata that describes the meaning/nature of data, etc.). For example, as shown at 314, a semantic type rule may dictate that semantic metadata such as "Spend" and "Spending" both correspond to the semantic type "spend." According to some aspects, the semantics analysis module 122 may store and/or use any type of semantic type rule.

An example output of metadata token matching rules 303 (e.g., inference rules, semantic type rules, metadata token matching rules 205 of FIG. 2, etc.) applied to tokenized metadata is shown at 304. For example, the column name "bus_sb_chrg_spend_am" may be inferred to be associated with the property/attribute "Amount" which may correlate to a semantic type of "spend."

Returning to FIG. 2, as described, the semantics analysis module 122 may use deep learning to determine semantics types. Training the semantics analysis module 122 for deep learning to determine/predict domain-specific semantic types may include extracting features from fixed-length representations of variable-length columns of the source corpus 201 that may be used along with the predefined semantic types (e.g., labeled datasets, etc.) to train the semantics analysis module 122 to determine, predict, and/or discover semantic types of data. For example, according to some aspects, to capture different properties of data structures of raw data, such as different properties of columns and/or the like, the semantics analysis module 122 may use feature categories 209 to extract different categories of features that may be used to train the neural network of the semantics analysis module 122 to determine/predict semantic types. According to some aspects, to identify different properties of columns of data from the source corpus 201 categories of features selected to be extracted from raw data to determine semantic types may include aggregated character distributions, word embeddings, paragraph vectors, global statistics, and/or the like.

The neural network of the semantics analysis module 122 may be configured to generate a vector encoding for each word that appears in a column to represent each column with a fixed-length numerical vector. For example, the semantics analysis module 122 may implement a sliding window (e.g., of a configurable size or default size) iterating over data from the source corpus 201 by selecting a subset of words from one or more data structures, such as one or more columns. The semantics analysis module 122 may apply a stochastic gradient descent to compute weights and biases that best fit a subnetwork of the neural network in predicting a target semantic type. The semantics analysis module 122 may average the set of weights for each word to compose a vector. The semantics analysis module 122 may pool together all vector representations of columns and random vector values may be selected. The semantics analysis module 122 may concatenate the column vector with the remaining value vectors, and one or more subnetworks may be trained to predict the random vector values from the concatenated vectors.

According to some aspects, the semantics analysis module 122 may extract features describing the distribution of characters in a column, for example, the columns 206, 207, and 208. The semantics analysis module 122 may compute and/or determine the count of all 128 American Standard Code for Information Interchange (ASCII) characters (e.g., punctuation characters, digits, letters, etc.) within each value of the columns 206, 207, and 208 (excluding whitespace). One or more statistical functions (e.g., any, average, all, mean, range, variance, min, max, median, sum, kurtosis, skewness, etc.) may be used to aggregate determined characters. For example, features based on character distribution may include "the range of numerical character values 0 to 1," "whether all values contain a '$' character," "the average amount of '+' characters," and/or any other character distribution based feature.

According to some aspects, the semantics analysis module 122 may extract features describing word embeddings (e.g., a type of word representation that allows words with similar meaning to have a similar representation, etc.) in a column, for example, the columns 206, 207, and 208. To characterize the semantic content of these values, the semantics analysis module 122 may store and/or access dictionary information, thesaurus information, and/or domain-specific terminology information that may be used to determine representations for text where words that have the same meaning have a similar representation. The semantics analysis module 122 may be trained with word embeddings representing various words and the semantic relationships between them unique to a domain, for example, such as the financial industry.

According to some aspects, the semantics analysis module 122 may extract features describing global statistics. For example, the semantics analysis module 122 may extract features describing high-level statistical characteristics of columns. For example, a "column entropy" feature may describe how uniformly values are distributed and may be used to differentiate between semantic types that contain more repeated values, such as "spend" from types that contain many unique semantic values, such as "remit." Other semantic types, like "cost" and/or "sales," may consist of many numerical characters, which may be captured by the feature "mean of the number of numerical characters in values."

According to some aspects, based on the feature categories implemented at 209, the semantics analysis module 122 may extract features 210 that may be used to determine semantic types 211. For example, the output of the system 200 may be a semantic type. According to some aspects, the features 210 and semantic types 211 may be provided to the neural network of the semantics analysis module 122. The semantics analysis module 122 may use the features 210 and/or semantic types 211 to determine/predict semantic types from raw data, for example, raw data from the data source 102 of FIG. 1.

Figure 3B:
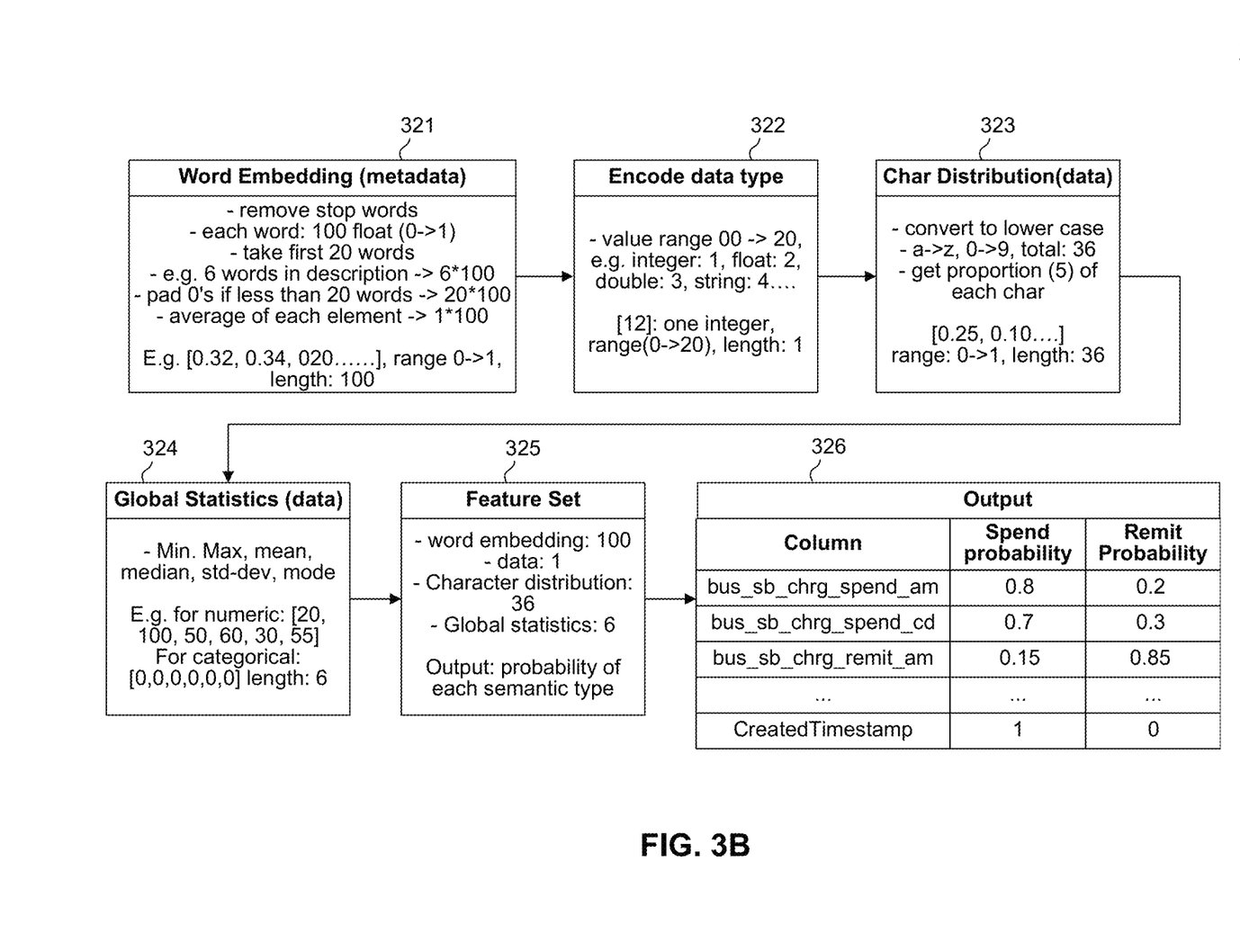
FIG. 3B shows another example flow diagram for determining semantic types from raw data.

FIG. 3B shows an example data flow 320 implemented by the semantics analysis module 122 to determine semantic types based on deep learning informed by different categories of features. The semantics analysis module 122 may use word embeddings at 321 to encode a data type at 322. The semantics analysis module 323 may determine a character distribution of the encoded data type at 324 and global statistics based on the character distribution at 325 to determine a set of features at 326 that best represent data. At 327, the semantics analysis module 122 may output semantic type predictions for each column of received data.

Figure 4:
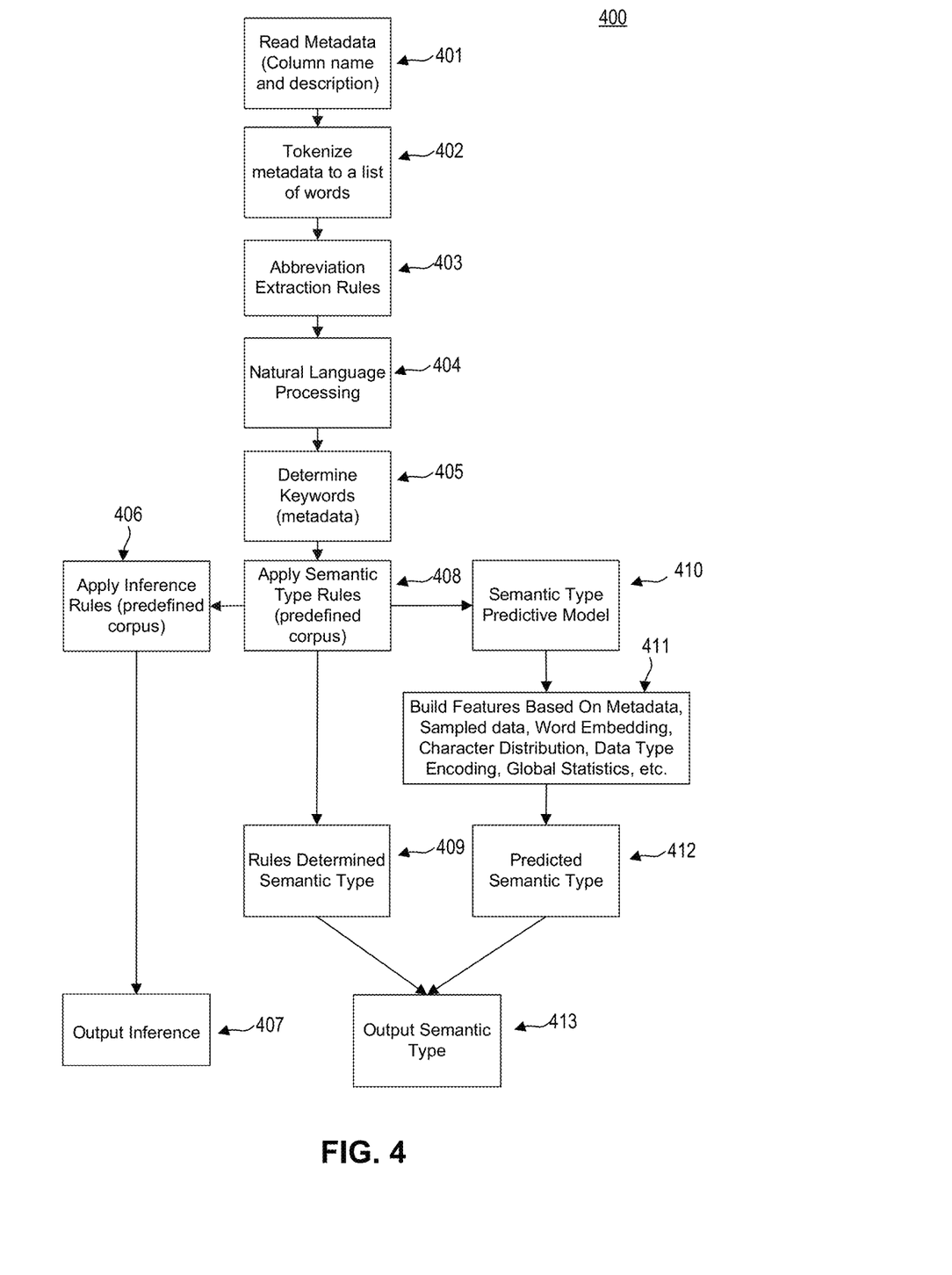
FIG. 4 shows yet another example flow diagram for determining semantic types from raw data.

FIG. 4 shows an example semantic type analysis diagram detailing steps implemented by the semantics analysis module 122 to determine semantic types from raw data, according to some aspects. At 401, the semantics analysis module 122 may determine and/or read metadata, such as a column name and description, from each data structure of the raw data.

At 402, the semantics analysis module 122 may tokenize the metadata. To conduct the tokenization, the semantics analysis module 122 may aggregate a list of words used in the metadata, such as a list of words used in the column name and description.

At 403, abbreviation extraction rules may be applied to the tokenized metadata to extract abbreviated words and/or terms. An abbreviation extraction rule is a rule that maps an abbreviation to a known word or phrase. For example, "spn" may be mapped to the word "spend." In this way, abbreviations used in the tokenized metadata can be normalized.

At 404, natural language processing may be applied normalized, tokenized metadata to identify any contextual data and/or information. Various known natural language processing algorithms may be used to extract the contextual data. For example, a bag-of-words algorithm can be used to map the vector listing the normalized, tokenized metadata to a context. In an example, a contextual tag may identify the financial domain.

At 405, based on the normalized, tokenized metadata and context determined using the natural language processing at step 404, one or more keywords may be selected. For example, if the context is "financial" and the term "spend" (or synonym of "spend") occurs frequently, then "spend" may be identified as a keyword.

At 406, the semantics analysis module 122 may apply one or more inference rules derived from a predefined corpus (e.g., a domain-specific corpus, etc.) to the keywords determined at 405. An inference rule may map raw data to a specific domain, for example, based on an occurrence(s) of keywords with the raw data. For example, an inference rule may instruct that if keywords "account" and "payments" are both derived from raw data that it may be inferred that the raw data is related to the financial industry (e.g., raw financial data, etc.).

At 407, the semantics analysis module 122 may output an inference regarding raw data based on applying the one or more inference rules derived from the predefined corpus at 406. For example, the semantics analysis module 122 may infer that raw data is related to a specific domain such as the financial industry and/or the like.

At 408, the semantics analysis module 122 may apply one or more semantic type rules derived from a predefined corpus (e.g., a domain-specific corpus, etc.) to the keywords determined at 405. For example, based on the context of the keywords, the semantics analysis module 122 may access a corpus of semantic types relating to the context of the keywords. For example, a keyword "billing" may relate to a corpus of financial semantic type rules. The corpus may include rules for determining additional semantic types from raw data. The semantics analysis module 122 may apply one or more semantic type rules derived from a predefined corpus by parsing raw data to determine instances of semantic types indicated by the corpus.

At 409, semantic types for the raw data may be determined by the semantics analysis module 122 based on one or more semantic type rules. For example, the semantics analysis module 122 may determine an output and/or result by applying the one or more semantic type rules derived from a predefined corpus at step 408. For example, a semantic type rule may instruct that semantics types "date" and "account number" may be determined from raw data from which a keyword "billing" has been determined.

At 410, the semantics analysis module 122 may use deep learning (a trained predictive model) to predict semantic types based on features built from the keywords determined at 405. For example, a predictive model of the semantics analysis module 122 trained to predict semantic types may start to build features that may be extracted from raw data to determine semantic types of the raw data.

At 411, features (e.g., aspects of raw data that provide analytical value, etc.) for predicting semantic types may be extracted based on metadata included with the raw data where the metadata is used s features to predict semantic types, sampled portions of the raw data where predefined feature extraction rules are applied to determine semantic types, word embeddings, character distributions (e.g., the distribution of extracted characters are used to indicate semantic types), data type encodings that may indicate semantic types, global statistics, and/or the like.

At 412, semantic types for the raw data may be predicted by the semantics analysis module 122. For example, semantic types for raw data may be predicted by the semantics analysis module 122 using the features extracted from the raw data. As described above, the semantics analysis module 122 may use a deep learning model to predict semantic types.

At 413, semantic types predicted at 412 may be assembled (e.g., according to user preferences, etc.) and/or compared with semantic types determined by the semantics analysis module 122 based on the one or more semantic type rules at 409. For example, semantic types "date" and "account number" determined at 409 may be grouped with semantic types such as "business account" and "personal account" that may be determined at 412. The semantics analysis module 122 may output the assembled semantic types may be output as determined semantic types for the raw data.

According to some aspects, the determined semantic types output at 413 may be compared to the inferred output at 407 to ensure accuracy. For example, if the determined semantic types "date", "account number", "business account", and "personal account" suggest semantic types relating to the financial industry, and the inferred context of the raw data suggests a different and/or dissimilar industry, then the semantics analysis module 122 may determine that a likely error in semantic type prediction and/or inference has occurred. Accordingly, adjustments and/or updates to feature building strategies, inference rules, and/or semantic type rules may be made. According to some aspects, when the determined semantic types correspond to the inferred context of the raw data, then the semantics analysis module may accept the determined semantic types as correct and/or proper semantic types for raw data (e.g., semantic types for data structures (e.g., columns, etc.) of data received from the data source 102, etc.)

Returning to FIG. 1, after the trained semantics analysis module 122 determines semantic types for data structures (e.g., columns, etc.) of data received from the data source 102, the computing device 104 may profile the data to determine preprocessing relative to the semantic types. For example, according to some aspects, the computing device 104 may include a data profiling module 126 configured to preprocess raw data and profile the data relative to semantic types.

According to some aspects, the data profiling module 126 may preprocess data by formatting, cleaning, and sampling the data. The data profiling module 126 may transform and/or convert the data into a format that is suitable for use by a machine learning model, for example, the target pipeline 106 and/or the like. To clean the data, the data profiling module 126 may remove and/or correct any missing data (e.g., null values, etc.). The data profiling module 126 may sample the data by selecting smaller representative portions of data that may be much faster for exploring and prototyping solutions before considering the whole data set. For example, the data profiling module 126 may process and/or analyze different instances of data, such as historic customer and/or financial account data, simulated data, projected data, estimated data, and/or a combination thereof. According to some aspects, the data profiling module 126 may determine simulated, estimated, and/or projected data to fill in and/or complete data by accessing a corpus of domain-specific data, for example, such as predefined financial data, semantic types, and/or the like. According to some aspects, the data profiling module 126 may determine simulated, estimated, and/or projected data to fill in and/or complete data by recognizing patterns in the data, fitting one or more functions to the data, and/or the like. The data profiling module 126 may fill in missing data using permutations of the missing data (e.g., each possible data value, each value at fixed increments between minimum and maximum values, and/or the like).

According to some aspects, the data profiling module 126 may examine raw data received from the data source 102 (before and/or after preprocessing) and determine/collect statistics and/or informative summaries about the raw data, such as an indication of a domain relating to the raw data (e.g., an indication of finance data, etc.). Determining the data profile may be based on column profiling, cross-column profiling, cross-table profiling, and/or data rule validation. According to some aspects, column profiling may involve the data profiling module 126 determining statistical measurements associated with the frequency distribution of data elements (e.g., data values, value types, etc.) within each data structure (e.g., column, etc.) of raw data received from the data source 102. In other words, the data profiling module 126 may determine a data profile for the raw data based on an amount of data elements of each data structure (e.g., column, etc.) satisfying a statistical threshold for indicating data profiles. The statistical threshold may be based on a distribution of characters indicated by each data element of a plurality of data elements for each column of raw data. For example, the data profiling module 126 may scan through raw data received from the data source 102 and determine that a number of occurrences of a data element "spend" or a data value "$3.00" within a column (and/or data structure) of the raw data satisfy a statistical threshold (e.g., an average, a mean, a highest number of occurrences, a median, etc.) for determining a data profile classification of financial data.

According to some aspects, cross-column profiling may involve the data profiling module 126 reviewing multiple columns (and/or data structures) of raw data received from the data source 102 to perform key and dependency analysis. Key analysis scans collections of values in raw data to locate a potential primary key. Dependency analysis determines the dependent relationships within the raw data. Applying both analyses, the data profiling module 126 may determine the relationships and dependencies between columns (and/or data structures) of the raw data. Relationships and dependencies between columns (and/or data structures) of the raw data may indicate a data profile for the raw data.

According to some aspects, cross-table profiling may involve the data profiling module 126 reviewing multiple tables (and/or data structures) of raw data received from the data source 102 to identify potential foreign keys. According to some aspects, the data profiling module 126 may determine the similarities and differences in syntax and data types between tables to determine which data might be redundant and which could be mapped together. According to some aspects, data rule validation may involve the data profiling module 126 evaluating raw data received from the data source 102 according to rules that check for the correctness and integrity of the data. According to some aspects, the data profiling module 126 may use any method and/or technique to profile raw data received from the data source 102 and/or the like.

According to some aspects, the data profiling module 126 may determine that the semantic types for a portion of data structures of the plurality of data structures correspond to a data profile. Based on determining that the semantic types correspond to the data profile, the data profiling module 126 may validate a semantic type, for example, a semantic type determined by the semantics analysis module 122, for each data structure of the portion of data structures of the raw data.

According to some aspects, to implement feature engineering based on semantic types of raw data received from the data source 102, the computing device 106 may construct transformation and aggregation logic based on semantic types (e.g., determined by the semantics analysis module 122, etc.) and data profiling (e.g., performed by the data profiling module 126, etc.). For example, the computing device 104 may include a feature engineering module 128. The feature engineering module 128 may be configured to determine transformation and/or aggregation logic for the raw data based on the determined semantic types and/or profiling.

According to some aspects, the feature engineering module 128 may use a semantic type determined for a data structure to select a feature engineering strategy/instruction for the data structure. For example, the feature engineering strategy/instruction may describe how to calculate an input feature for a machine learning model such as the target pipeline 106 and/or the like based on a plurality of data elements (e.g., values, attributes, etc.) of a data structure (e.g., column, etc.) of raw data and/or the like. The feature engineering module 128 may store and/or access stored feature engineering strategies and/or instructions. For example, feature engineering strategies and/or instructions may be stored as a lookup table, a relationship diagram, metadata, and/or any other form that may be suitable for the feature engineering module 128. According to some aspects, feature engineering strategies and/or instructions may be generic or domain-specific.

Figure 5:
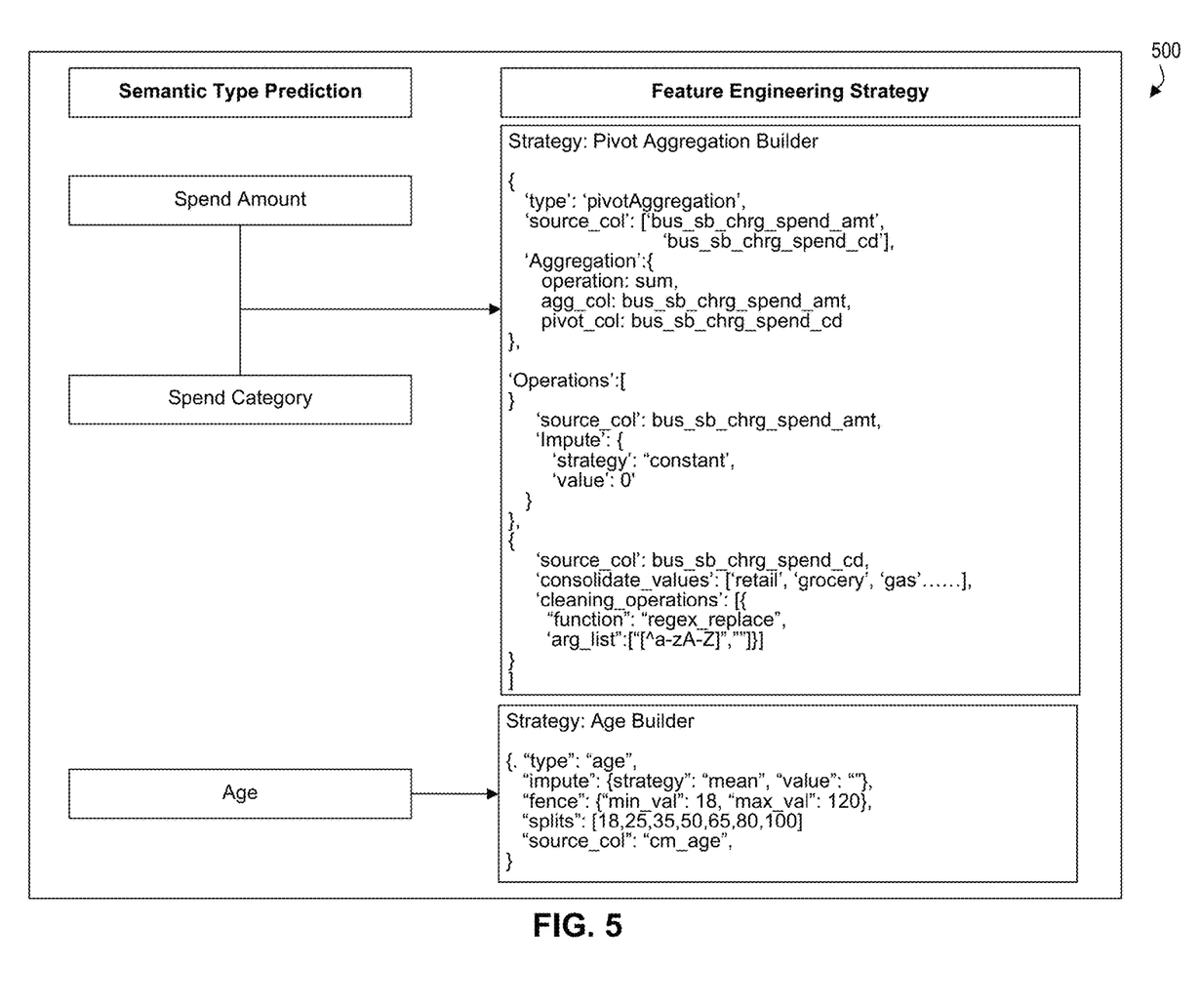
FIG. 5 shows an example diagram that maps semantic types to feature engineering strategies/instructions, according to some aspects.

FIG. 5 is an example diagram 500 that maps semantic types to feature engineering strategies/instructions. The feature engineering module 128 may store and/or access diagram 500 to select a feature engineering strategy/instruction based on a determined/predicted semantic type. For example, semantic types "spend amount," and "spend category," together, may map/correspond to a strategy "Pivot Aggregation Builder" that includes instructions for automatically generating features related to the semantic type. According to some aspects, feature engineering instructions may indicate the type, range, and location of values and/or attributes to be extracted as features. According to some aspects, feature engineering instructions may include imputation rules and/or indicate filtering and/or cleaning operations to be applied to data to extract features. Feature engineering strategies/instructions may include any information required to generate generic and/or domain-specific features to be input into a machine learning model such as the target pipeline 106 and/or the like.

Returning to FIG. 1, according to some aspects, the feature engineering module 128 may use a selected feature engineering strategy/instruction to determine, generate, and/or engineer features. According to some aspects, engineered features may be input to the target pipeline 106. The target pipeline 106 may be configured to use the features to make a prediction associated with the raw data and/or unseen raw data. For example, engineered features may better represent the nature and/or underlying concepts of data (e.g., domain-specific data, etc.) to the target pipeline 106, resulting in improved accuracy of target pipeline 106 on unseen data. According to some aspects, features may be engineered in a format suitable for a machine learning model (e.g., the target pipeline 106, etc.), for example, such as a platform-independent data format (e.g., JavaScript Object Notation (JSON), Python, MongoDB, YAML, etc.) so that the features may be prepared for and/or input to the machine learning model with minimal coding or without coding. As described, engineering domain-specific features provides improvements over current feature engineering methods, applications, tools, systems, devices, and/or the like by enabling a user (e.g., a machine learning engineer, a data analyst/scientist, etc.) to automatically engineer features (e.g., from scratch, etc.) for a target pipeline without domain knowledge input from the user.

According to some aspects, the computing device 104 may be configured to rank and/or optimize engineered features. For example, the computing device 104 may include a feature analysis module 130 configured to rank and/or optimize engineered features. For example, the feature analysis module 130 may collect and scrutinize each engineered feature based on the nature of the data to be analyzed (e.g., financial industry data, etc.) to identify features that are unique, differentiated, dense, and/or associative. According to some aspects, engineered features may be allocated scores based on how the features correlate with a dependent variable (e.g., a property being predicted/estimated), and can then be ranked by their scores. For example, according to some aspects, engineered features may be allocated scores based on how many times each feature is used for splitting a node.

According to some aspects, features with the highest scores can be selected for inclusion in a training dataset for a machine learning model (e.g., the target pipeline 106, etc.), whereas those remaining can be ignored. Feature rankings may be used to extract and/or construct new features, similar but different to those that have been estimated to be useful (e.g., high ranking features, etc.). Feature rankings may be used to optimize feature engineering strategies/instructions used by the computing device (e.g., the feature engineering module 128, etc.). For example, feature engineering strategies/instructions that produce optimally ranked features may be stored and/or used as default strategies/instructions, and/or feature engineering strategies/instructions that produce non-optimally ranked features may be revised, discarded, and/or the like. The feature analysis module 130 may rank and/or optimize engineered features to facilitate reinforcement learning and to improve logic creation and semantic type determination/identification.

Figure 6:
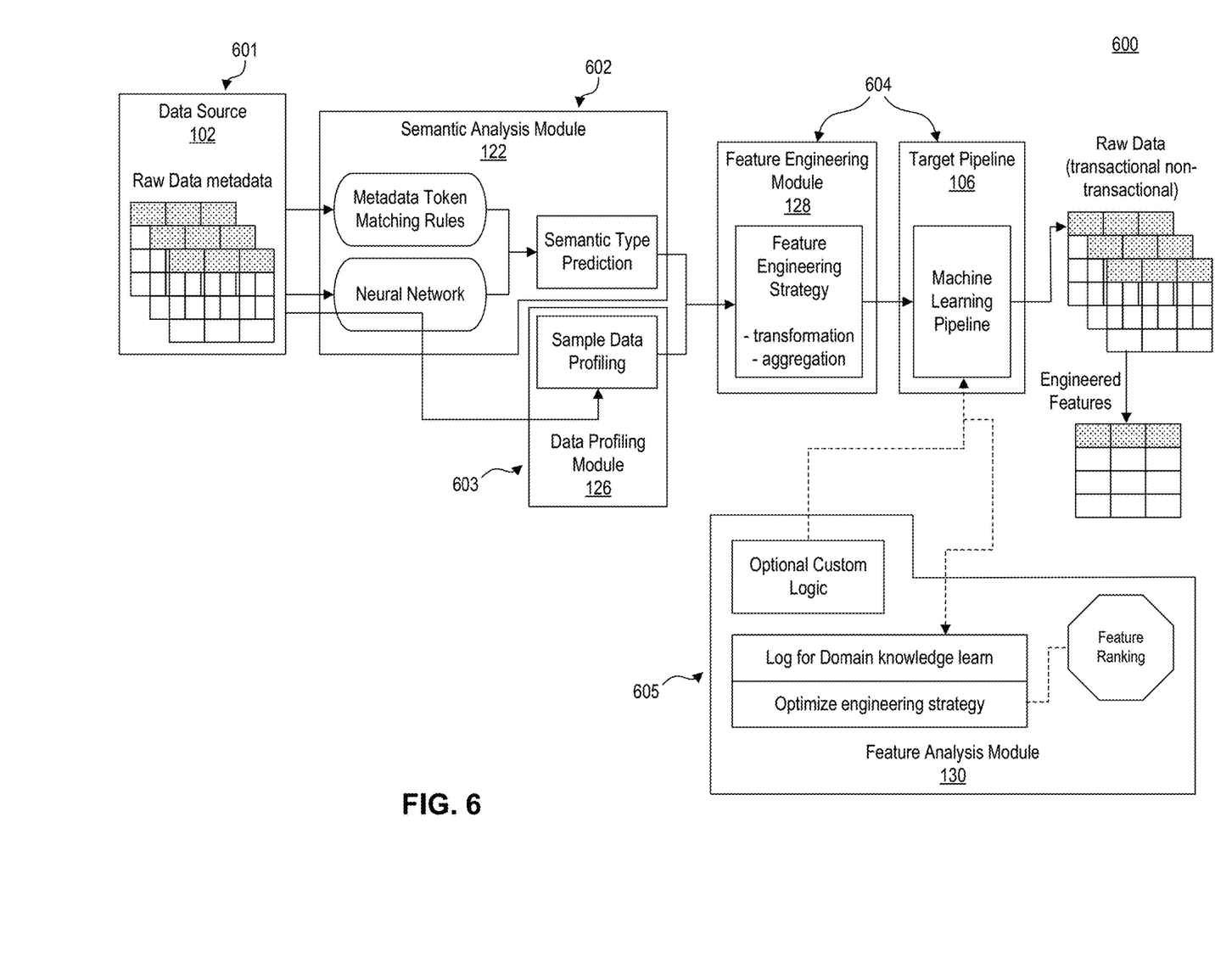
FIG. 6 shows an example high-level diagram of a process for feature engineering based on semantic types, according to some aspects.

FIG. 6 is an example high-level diagram of a process 600 for feature engineering based on semantic types. Operations performed by components of the system 100 of FIG. 1 are indicated in FIG. 6. For example, at 601, raw data (e.g., metadata, etc.) from the data source 102 may be provided to the semantic analysis module 122. At 602, the semantic analysis module 122 may implement metadata token matching rules and deep learning algorithms via a multi-layered neural network to determine/predict semantic types for the raw data.

At 603, the data profiling module 126 may profile the raw data from the data source 102 to determine preprocessing relative to the semantic types determined by the semantic analysis module 122. The data profiling module 126 may be used to validate, verify, corroborate, and/or the like semantic type predictions made by the semantic analysis module 122. According to some aspects, profiling by the data profiling module 126 and/or semantic type predictions output by the semantic analysis module 122 may be reviewed, for example, via the communication module 120 of FIG. 1, with full transparency to enable modification/updating to the profiling scheme implemented by the data profiling module 126 and/or the semantic type prediction algorithm executed by the semantic analysis module 122.

At 604, the feature engineering module 128 may construct transformation and aggregation logic and/or implement predefined transformation and aggregation logic based on semantic types output by the semantic analysis module 122 and profiling output by the by the data profiling module 126. The transformation and aggregation logic may be used to select a feature engineering strategy for generating features that may be employed by the target pipeline 106 to determine/predict semantic types of unseen raw data (e.g., transactional data, non-transactional data, domain-specific data, etc.). The target pipeline 106 may be configured to combine automatically generated features with manually created features to make determinations/predictions based on unseen data. At 605, engineered features may be ranked and/or optimized by the feature analysis module 130. A ranking of engineered features may be used to reassign and/or create new semantic types by updating and/or modifying a feature engineering strategy. For example, a feature engineering strategy that outputs low ranking and/or non-optimal features may be modified/updated to output features that may enable the target pipeline 106 to operate more effectively with more accurate predictions, descriptions, and/or evaluations of unseen data.

Figure 7:
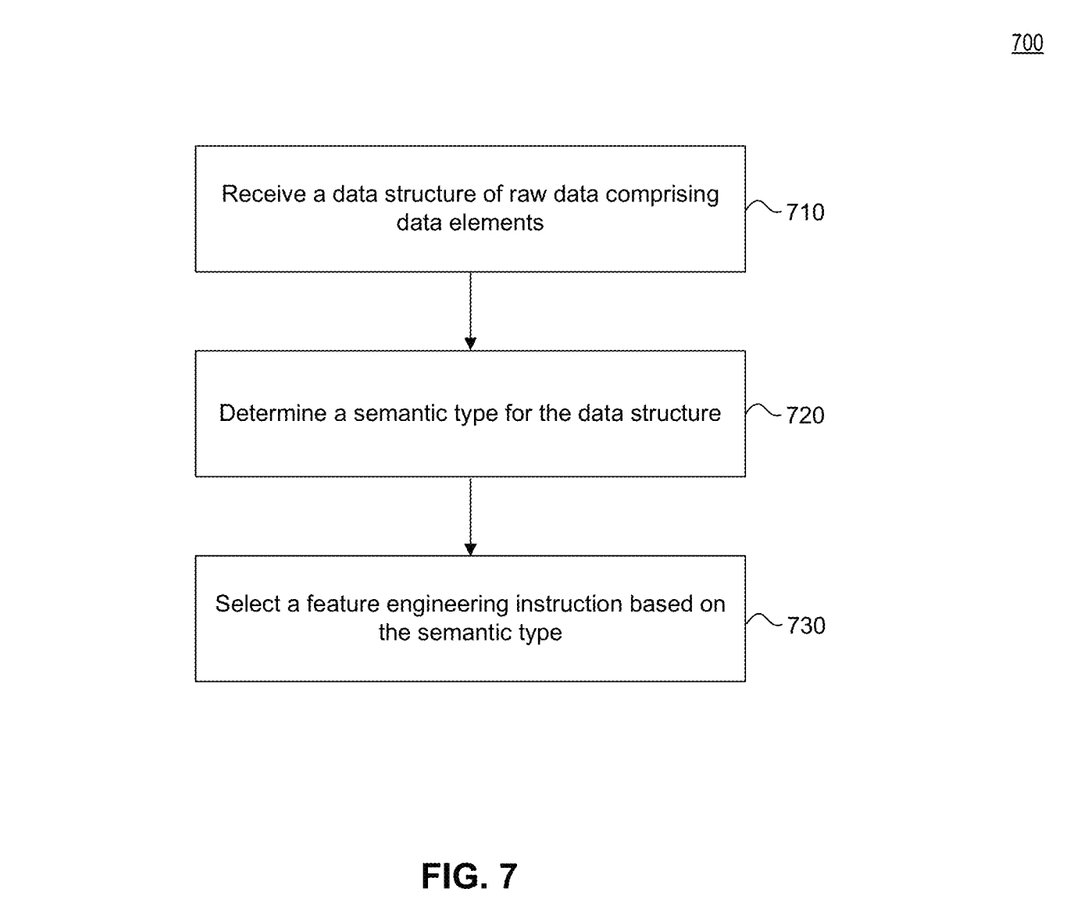
FIG. 7 shows a flowchart of an example method for feature engineering based on semantic types, according to some aspects.

FIG. 7 shows a flowchart of an example method 700 for feature engineering based on semantic types, according to some aspects. Method 700 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art(s).

In 710, a computer-based system (e.g., the computing device 104, etc.) may receive a plurality of data structures of raw data. The raw data may include transactional datasets and/or relational datasets. For example, transactional data may include structured data and/or data that is clearly defined and/or searchable, such as financial data (e.g., bank withdrawals and/or deposits, etc.), insurance costs and/or claims data, purchase and/or sale data, logistics data, and/or the like. Relational data may multiple include data structures (e.g., columns, tables, etc.) that collectively have importance due to the interrelation of data elements, rather than an individual data structure expressing any importance. According to some aspects, each data structure of the plurality of data structures may include a plurality of data elements. For example, a data structure may include a column of data and/or the like, and a data element may include values, content, text, and/or the like within the column of data and/or the like.

In 720, the computer-based system may determine semantic types for data structures. For example, for each data structure of the plurality of data structures, the computer-based system may determine a semantic type for the data structure based on a semantic rule that describes how to infer a semantic type from a data element of the plurality of data elements.

In 730, for each data structure of the plurality of data structures, the computer-based system may select a feature engineering instruction for the data structure. For example, the computer-based system may select a feature engineering instruction for the data structure based on the determined semantic type. The feature engineering instruction may specify how to calculate an input feature for a machine learning model based on the plurality of data elements for the data structure.

According to some aspects, method 700 may further include determining a data profile for the raw data. For example, the computer-based system may determine a data profile for the raw data based on an amount of data elements of the plurality of data elements of each data structure of the plurality of data structures satisfying a statistical threshold for indicating data profiles. The statistical threshold may be, for example, based on a distribution of characters indicated by each data element of the plurality of data elements for each column of the plurality of columns. The computer-based system may determine the statistical threshold by any means and/or technique. According to some aspects, determining the data profile may include column profiling, cross-column profiling, cross-table profiling, data rule validation, combinations thereof, and/or the like. The computer-based system may determine the data profiles by any means and/or technique. The computer-based system may determine that the semantic types for a portion of data structures of the plurality of data structures correspond to the data profile.

The computer-based system may validate the semantic type for each data structure of the portion of data structures of the raw data. For example, the computer-based system may validate the semantic type for each data structure of the portion of data structures of the raw data based on determining that the semantic types correspond to the data profile.

According to some aspects, the method 700 may further include determining one or more features. For example, the computer-based system may determine, generate, and/or engineer one or more features based on the one or more corresponding feature engineering instructions. The computer-based system may be configured to send the one or more features, for example, to a data pipeline configured to ingest the raw data. The one or more features may facilitate a prediction associated with the raw data.

Figure 8:
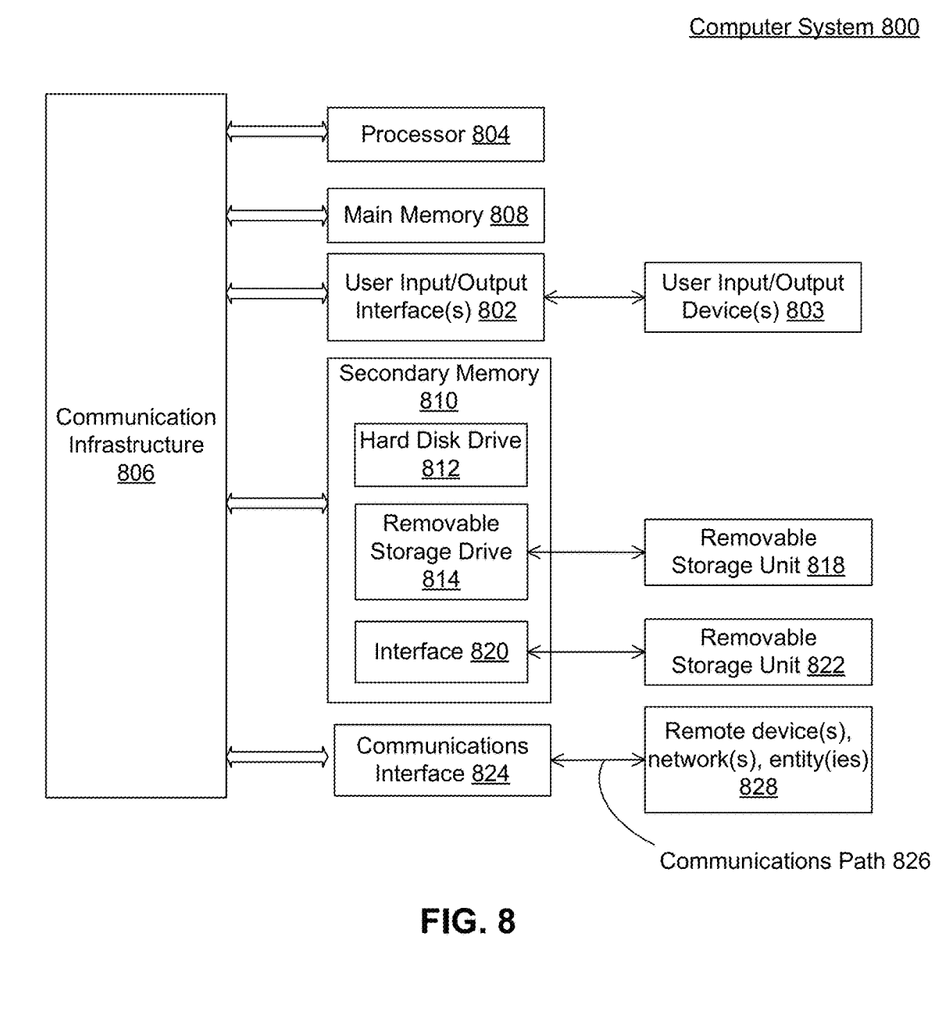
FIG. 8 shows an example computer system, according to embodiments of the present disclosure.

In the above description, numerous specific details such as resource partition FIG. 8 is an example computer system useful for implementing various embodiments. Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure or bus 806 through user input/output device(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, a tape backup device, and/or any other storage device/drive.

Removable storage drive 814 may interact with a removable storage unit 818. The removable storage unit 818 may include a computer-usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to the removable storage unit 818.

Secondary memory 810 may include other means, devices, components, instrumentalities, and/or other approaches for allowing computer programs and/or other instructions and/or data to be accessed by computer system 800. Such means, devices, components, instrumentalities, and/or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communications path 826.

Computer system 800 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof. Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, and/or schemas may be used, either exclusively or in combination with known or open standards.

In some aspects, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

Additionally and/or alternatively, while this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

One or more parts of the above implementations may include software. Software is a general term whose meaning of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for determining features from raw data, the method comprising:
   receiving a plurality of data structures of raw data, wherein each data structure of the plurality of data structures comprises a respective plurality of data elements;

determining a data profile for the raw data based on an amount of data elements of the respective plurality of data elements for at least one data structure of the plurality of data structures satisfying a statistical threshold for indicating the data profile; and for each data structure of the plurality of data structures of the raw data:

determining, based on a semantic rule that describes how to infer a semantic type from a data element of the respective plurality of data elements, the semantic type for each data structure, and selecting, based on the determined semantic type, an instruction that describes how to calculate an input feature for a machine learning model based on the respective plurality of data elements for each data structure, and wherein the semantic types for at least a portion of data structures of the raw data are validated based on a determination that the semantic types for at least the portion of data structures correspond to the data profile.

2. The computer-implemented method of claim 1, wherein the raw data comprises at least one of transactional datasets or relational datasets.

3. The computer-implemented method of claim 1, wherein determining the data profile is further based on at least one of column profiling, cross-column profiling, cross-table profiling, or data rule validation.

4. The computer-implemented method of claim 1, wherein the statistical threshold for indicating the data profile is based on a distribution of characters indicated by each data element of the respective plurality of data elements for each data structure of the plurality of data structures.

5. The computer-implemented method of claim 1, further comprising determining, based on the selected instruction, one or more machine learning-features.

6. The computer-implemented method of claim 5, further comprising sending, to a data pipeline configured to ingest the raw data, the one or more machine learning-features, wherein the one or more machine learning-features facilitate a prediction associated with the raw data.

7. The computer-implemented method of claim 5, wherein the one or more machine learning-features facilitate a prediction associated with new data that is different from the raw data.

8. A non-transitory computer-readable medium having instructions stored thereon that, when executed by at least one computing device, cause the at least one computing device to perform operations for determining features from raw data comprising:

receiving a plurality of data structures of raw data, wherein each data structure of the plurality of data structures comprises a respective plurality of data elements;

determining a data profile for the raw data based on an amount of data elements of the respective plurality of data elements for at least one data structure of the plurality of data structures satisfying a statistical threshold for indicating the data profile; and for each data structure of the plurality of data structures of the raw data:

determining, based on a semantic rule that describes how to infer a semantic type from a data element of the respective plurality of data elements, the semantic type for each data structure, and selecting, based on the determined semantic type, an instruction that describes how to calculate an input feature for a machine learning model based on the respective plurality of data elements for each data structure, and wherein the semantic types for at least a portion of data structures of the raw data are validated based on a determination that the semantic types for at least the portion of data structures correspond to the data profile.

9. The non-transitory computer-readable medium of claim 8, wherein the raw data comprises at least one of transactional datasets or relational datasets.

10. The non-transitory computer-readable medium of claim 8, wherein determining the data profile is further based on at least one of column profiling, cross-column profiling, cross-table profiling, or data rule validation.

11. The non-transitory computer-readable medium of claim 8, wherein the statistical threshold for indicating the data profile is based on a distribution of characters indicated by each data element of the respective plurality of data elements for each data structure of the plurality of data structures.

12. The non-transitory computer-readable medium of claim 8, the operations further comprising determining, based on the selected instruction, one or more machine learning-features.

13. The non-transitory computer-readable medium of claim 12, further comprising sending, to a data pipeline configured to ingest the raw data, the one or more machine learning-features, wherein the one or more machine learning-features facilitate a prediction associated with the raw data.

14. The non-transitory computer-readable medium of claim 12, wherein the one or more machine learning-features facilitate a prediction associated with new data that is different from the raw data.

15. A system comprising:

a memory; and at least one processor coupled to the memory and configured to perform operations for determining features from raw data comprising:

receiving a plurality of data structures of the raw data, wherein each data structure of the plurality of data structures comprises a respective plurality of data elements;

determining a data profile for the raw data based on an amount of data elements of the respective plurality of data elements for at least one data structure of the plurality of data structures satisfying a statistical threshold for indicating the data profile; and for each data structure of the plurality of data structures of the raw data:

determining, based on a semantic rule that describes how to infer a semantic type from a data element of the respective plurality of data elements, the semantic type for each data structure, and selecting, based on the determined semantic type, an instruction that describes how to calculate an input feature for a machine learning model based on the respective plurality of data elements for each data structure, and wherein the semantic types for at least a portion of data structures of the raw data are validated based on a determination that the semantic types for at least the portion of data structures correspond to the data profile.

16. The system of claim 15, wherein the raw data comprises at least one of transactional datasets or relational datasets.

17. The system of claim 15, wherein determining the data profile is further based on at least one of column profiling, cross-column profiling, cross-table profiling, or data rule validation.

18. The system of claim 15, wherein the statistical threshold for indicating the data profile is based on a distribution of characters indicated by each data element of the respective plurality of data elements for each data structure of the plurality of data structures.

19. The system of claim 15, the operations further comprising determining, based on the selected instruction, one or more machine learning-features.

20. The system of claim 19, further comprising sending, to a data pipeline configured to ingest the raw data, the one or more machine learning-features, wherein the one or more machine learning-features facilitate at least one of a prediction associated with the raw data or a prediction associated with new data that is different from the raw data.

* * * * *